United States Patent [19]  [11] 4,370,672
Ross et al.  [45] Jan. 25, 1983

[54] COLOR SUBCARRIER REGENERATOR FOR SLOW DOWN PROCESSOR

[75] Inventors: Michael D. Ross, Somerdale; Jon K. Clemens, Skillman, both of N.J.

[73] Assignee: RCA Corporation, New York, N.Y.

[21] Appl. No.: 190,277

[22] Filed: Sep. 24, 1980

[51] Int. Cl.³ .......................... H04N 5/76; H04N 9/46
[52] U.S. Cl. ...................................... 358/312; 358/19
[58] Field of Search ................ 358/4, 8, 17, 19, 128.6; 360/10, 37

[56] References Cited

U.S. PATENT DOCUMENTS 4,101,926  7/1978  Dischert et al. ................... 358/19 X
4,110,785  8/1978  Dischert et al. ..................... 358/8 X
4,249,199  2/1981  Harwood et al. ...................... 358/19
4,277,796  7/1981  Ross ........................................ 358/8

Primary Examiner—Aristotelis M. Psitos
Attorney, Agent, or Firm—E. M. Whitacre; J. S. Tripoli; R. G. Coalter

[57] ABSTRACT

Luminance and chrominance components of a video input signal are stored at one rate and recovered at a lesser rate, 1/N, by means of a frame store to effect video signal bandwidth reduction. Burst is not stored but rather is regenerated and added to the video output signal to conserve memory space. To avoid undesirable hue changes and the necessity of rephasing the regenerated burst signal when switching between different video sources, the burst regenerator includes means for forming a product signal from two signals. One signal is locked to incoming burst, and the other signal is derived from a reference source having a phase related to that of burst. The latter signal is reduced in frequency by a factor (N−1)/N prior to forming the product signal and phase shift is added to a signal path such that the resultant difference component of the product signal exhibits a phase relative to that of the recovered chrominance component which equals the chroma-burst phasing of the video signal supplied to the frame store by any of the video sources. The difference component is then added as a burst component to the recovered chrominance component to form a composite output signal.

6 Claims, 7 Drawing Figures

COLOR SUBCARRIER REGENERATOR FOR SLOW DOWN PROCESSOR

This invention relates to video signal processors and particularly to video signal slow down processors of the kind for producing video signals at less than "real time" rates which may advantageously be used in electromechanical video disc mastering applications.

In electromechanical mastering of video disc records the very high information density involved would require the use of a cutterhead of exceptionally wide bandwidth if the mastering was done in real rime. Cutterhead requirements become less stringent if the recording is done at less than real time rates by reducing the mastering turntable speed and proportionally reducing the recording signal bandwidth. A slow down processor which effects a reduction of bandwidth without loss of the informational content of the slowed down signal is disclosed in the copending U.S. Patent Application of M. D. Ross entitled "SLOW DOWN PROCESSOR FOR VIDEO DISC MASTERING", Ser. No. 87,452 filed Oct. 22, 1979, and now U.S. Pat. No. 4,277,796 which is incorporated herein by reference.

In the Ross apparatus, a tape recorder produces a redundant field video signal, each field being produced at a rate corresponding to the rate at which it was originally recorded. A selected field of each set of redundant fields is written into a memory at a given clock rate and the stored fields are read from the memory at a lesser clock rate, the ratio of the clock rates being predetermined in accordance with the redundancy level of the redundant field video signal.

It is desirable in practicing the Ross invention to store only those portions of the selected fields which are representative of picture information and to regenerate repetitive video signal components (e.g., color burst and horizontal sync) at the output of the storage unit thereby substantially reducing the storage requirements. Video storage units having such a feature are commercially available. One example is the type TFS-121 frame synchronizer made by RCA Corporation.

The present invention is directed to solving a heretofore unrecognized problem which may arise in practicing the Ross invention when plural video sources are selectively coupled to a storage unit of the color burst regeneration type. The problem is particularly evident when switching between a plurality of signal sources. Under these conditions, the phase relationship between the stored chrominance component of the video signal and the regenerated burst signal can be undesirably altered thus causing a color change and necessitating rephasing of the burst regenerator for each change of signal sources. This problem persists even though all signal sources and the frame synchronizer may be coupled to a common source of timing signals. The basic cause of the problem is related to the method of burst regeneration and will be discussed in detail subsequently. The present invention resides in a novel color subcarrier regenerator which provides a solution to this new problem without necessitating modification of the signal sources, interconnecting cables, or video switchgear.

The color subcarrier regenerator of the present invention is intended for use in a video signal frame store of the type in which luminance and chrominance components of a composite video input signal are stored at one rate and recovered from the frame store at a lesser rate 1/N, N being an integer greater than unity. The regenerator comprises first means responsive to the color burst component of the video input signal for producing a first conversion signal of the color burst frequency and a second means responsive to a fixed reference frequency signal for producing a second conversion signal having a frequency less than that of the first conversion signal by a factor (N-1)/N. The conversion signals are multiplied to form a product signal having sum and difference components and the latter is applied as a color subcarrier reference signal to combining means in the frame store for forming a composite video output signal having a regenerated burst component. Means are provided for effectively adjusting the phase of the difference component of the product signal to a value such that the regenerated burst component exhibits a phase relative to the chrominance component of the video output signal which is substantially equal to the chrominance-burst phase relationship of the video input signal.

IN THE DRAWINGS

Figure 1:
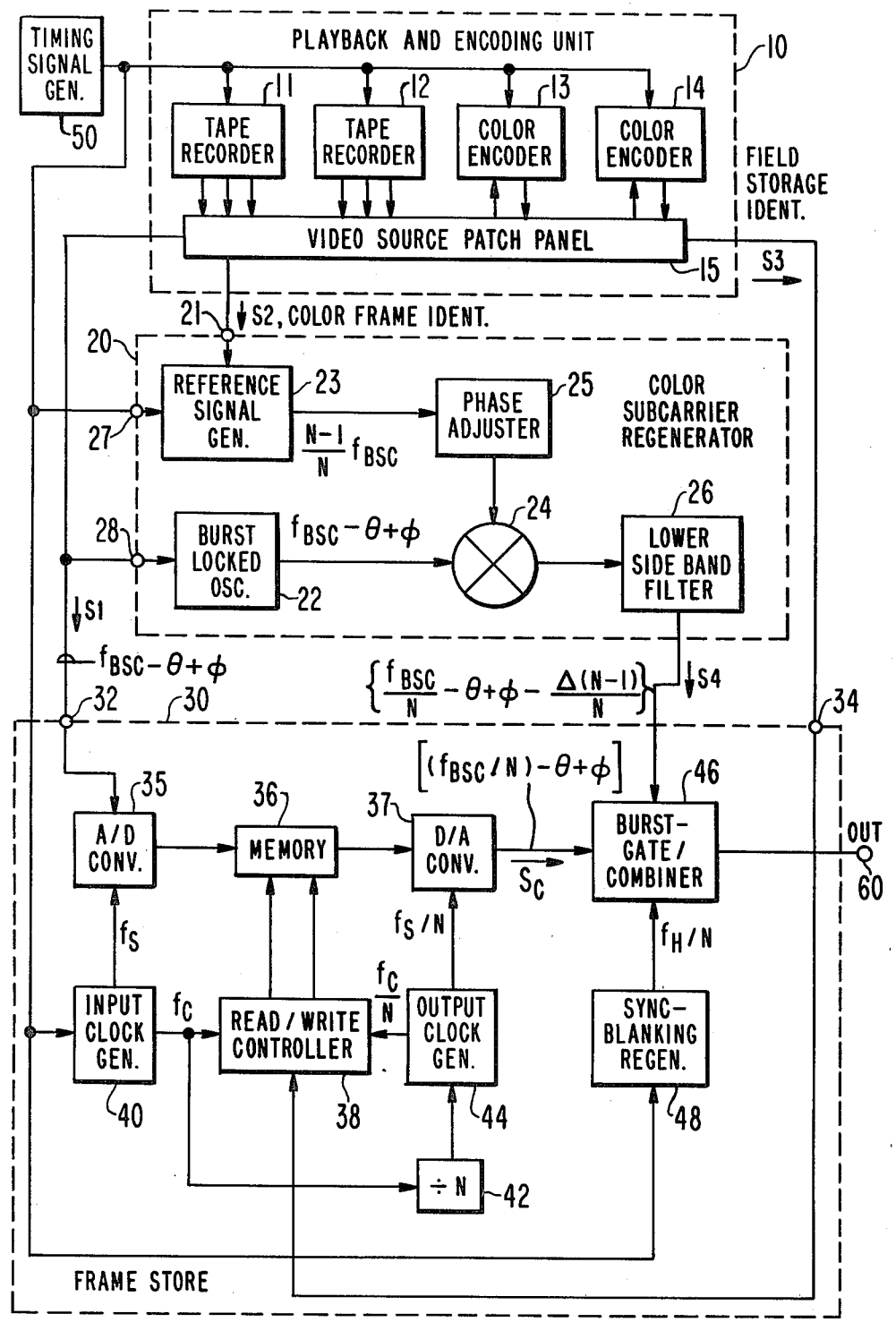
FIG. 1 is a block diagram illustrating a preferred embodiment and a preferred application of the invention in a slowdown processor for video disc mastering.

The slowdown processor of FIG. 1 comprises a playback and encoding unit 10, a color subcarrier regenerator 20 and a frame store 30 all synchronized by means of a timing signal generator 50. Encoding unit 10 includes two slow motion tape recorders 11 and 12, two color encoders 13 and 14 and a video signal patch panel 15. Panel 15 serves to couple the video output signal of either of the recorders to the input of either of the encoders and also to connect the output signal S1 produced by the selected color encoder to the video input terminal 32 of frame store 30. Panel 15 additionally couples a color frame identification signal S2 and a field storage identification signal S3 produced by the selected recorder 11 or 12 to input terminals 21 and 34, respectively, of regenerator 20 and frame store 30. Recorders 11 and 12 and encoders 13 and 14 are synchronized by color and line frequency reference signals produced by timing signal generator 50. A generator suitable for producing NTSC format standard video reference signals is the Tektronix Model 146 NTSC Test Signal Generator. (For processing signals in other formats such as PAL an appropriate generator should be used).

Recorders 11 and 12 are slow motion video tape recorders and are preferably of the non-segmented helical scan type such as the Ampex Corporation Model VPR-1 or VPR-2 Video Production Recorders. In such machines the video pickup head is servo controlled for movement in two planes within the video scanning drum. This feature, referred to as automatic scan tracking (AST), enables the video head to repeatedly scan a given field recorded on the tape before advancing to the next field. For slow motion, the tape speed of the recorder is reduced in proportion to the number of times each field is scanned and the video head velocity is maintained at its normal value so that redundant (repeated) fields are produced at the normal field rate (about 60 fields per second in the NTSC system). Another suitable tape recorder is the Model BVH-1000 VTR manufactured by Sony Corporation which features a dynamic tracking option similar to the Ampex AST System.

The redundant field normal rate (60 fields/sec) video signals produced by recorder 11 (or 12) is translated to buried subcarrier format (BSC) prior to selective storage in frame store 30 by means of color encoder 13 (or 14). In the buried subcarrier format (described by Pritchard in U.S. Pat. No. 3,872,498) chrominance information is represented by a color subcarrier of the general form employed in the well known NTSC format but is buried in a lower portion of the video band rather than being located in the high end of the luminance signal band. An illustrative subcarrier frequency choice for encoding of NTSC format signals is in the vicinity of 1.53 MHz with color sidebands extending ±500 KHz thereabout and with the luminance signal band extending well above the highest color subcarrier frequency (to 3 MHz, for example). The Pritchard patent discloses suitable arrangements for implementing the color encoding function of encoders 13 and 14. While buried subcarrier encoding is preferred when the processor of FIG. 1 is used as a video disc mastering signal source, it is not essential to the present invention. The principles of the present invention apply to high band and low band color formats as well as to the BSC format. Also, other subcarrier choices such as 1.52 MHz or 2.29 MHz may be more appropriate when processing PAL format signals in buried subcarrier form.

Frame store 30 is similar in many respects to conventional storage units used for frame synchronization in television studio applications (see, for example U.S. Pat. Nos. 4,101,926 and 4,110,785 which issued July 18, 1978 and Aug. 10, 1978, respectively) and may be implemented by modifying a conventional frame synchronizer as described in the aforementioned Ross Patent Application. A commercially available synchronizer suitable for this purpose is the model TFS-121 "VIDEO FRAME SYNCHRONIZER" sold by RCA Corporation.

Frame store 30 comprises an analog-to-digital (A/D) converter 35 for converting the composite video signal S1 to digital form for application to memory 36 and a digital-to-analog (D/A) converter 37 for reconverting the signal back to analog form. In the type TFS-121 synchronizer the A/D converted output is bit serial and a serial-in parallel-out (SIOP) buffer is used to convert the signal to a word organized form (8 bit) for storage in memory 36. A parallel-in-serial-out (PISO) buffer is then used for reconverting the memory output to serial form for D/A converter 37. A/D converter 35 receives a sampling signal $f_s$ from an output of input clock generator 40 which is synchronized with timing signals supplied by generator 50. A preferred value of $f_s$ is 4fsc, wherein fsc is the NTSC color burst frequency. Clock generator 40 also supplies a write clock signal $f_c$ to read/write controller 38 and to the input of divider circuit 42 which divides $f_c$ by N, an integer greater than unity, which represents the slow down factor, i.e., the number of identical fields in each redundant field set produced by the selected slow motion tape recorder. The resultant timing signal reduced by the factor N is applied to the input of the output clock generator 44 which, in turn, supplies a reduced rate sampling signal ($f_s$N) to D/A converter 37 and a reduced rate read clock signal ($f_c$/N) to read/write controller 38.

The aforementioned Ross application gives specific examples of how to select fields such that those which are stored form a proper NTSC color field sequence, (i.e., odd, 0°; even, 0°; odd 180°; even 180°) when recovered from the memory 36 of the frame store. In FIG. 1 herein, the selection is controlled by the field storage identification signal S3 applied to read/write controller 38. As explained in the Ross application, S3 may be derived from the sync correction signal that is normally used for correcting vertical sync in the slow motion tape recorder when the slow down factor, N, is equal to 2. Generation of S3 for other slow down factors is described is the Ross application.

Video timing signals (e.g., sync, blanking and burst) are not stored in the memory since they are predictable repetitive functions. Rather, they are added to the output of D/A converter 37 by means of burst sync combiner 46. It is conventional practice in storing digitized video signals to reinsert timing signals which are rephased replicas of the original timing signals. Here, however, the reinserted timing signals are related to the redundancy level, N of the input video signal. (As used herein, redundancy level means the number of replications of a given field produced by the selected slow motion recorder before the video head is advanced to the next field). Specifically; burst, sync and blanking are added to the output of D/A converter 37 at 1/Nth of their original respective periods. For half rate (N=2) mastering of BSC encoded video, the burst is reinserted at a frequency of 765 KHz (1.53 MHz/2), vertical blanking pulses are added at a repetition rate of about 30/sec (one half the NTSC standard field rate) and horizontal synchronizing pulses are added at 127 microsecond intervals (2 fH). The blanking and sync signals are derived from the NTSC timing signal produced by generator 50 by means of sync-blanking regenerator 48. Burst-gate/combiner 46 includes a gate responsive to the regenerated horizontal synchronizing signal produced by sync regenerator 48 for gating the color subcarrier reference signal S4 produced by regenerator 20 prior to addition thereof to the recovered luminance and chrominance and the regenerated blanking and sync signals. The gate is enabled during the so called "back porch" interval of the horizontal sync pulse and for a period of time N times as long as in the NTSC standard. Since the gate time is increased by the same factor, N, as the regenerated subcarrier is reduced in frequency, the output burst signal includes the same number of cycles (3-4) as in normal (real time) rate BSC composite video signals.

Three aspects of the portion of the processor described thus far are of particular revelance to understanding the subtle nature of the new problem to which the present invention is directed. The first is that the regenerated color subcarrier S4 should be reduced in frequency relative to the burst component of S1 by the same factor N which relates the read and write clock rates. The second aspect is that for any specific source of S1 (e.g., recorder 11 and encoder 13) the regenerated color subcarrier S4 should exhibit the same phase relationship with the reproduced chrominance signal as exists between the chrominance and burst components of S1 at the input of frame store 30. The third aspect is that no change in the output signal color phasing should occur when switching between different combinations of encoders and recorders.

The first two factors noted above may be realized by locking an oscillator to the burst component of S1, dividing the oscillator output by a modulo N counter and phase shifting the resultant signal until the input-output chrominance-burst phase relationships of frame store 30 are identical. Such an arrangement, however, can satisfy the third factor if and only if the various combinations of signal sources exhibit precisely the same phase relationship between the video input terminal 32 of frame store 30 and the color reference signal produced by timing signal generator 50. While theoretically possible, such a situation is highly unlikely since even slight differences in the lengths of the interconnecting cables in unit 10 can alter the phasing of the chrominance and burst components of S1 at the input of frame store unit 30 relative to the phase of the color reference signal produced by generator 50.

Summarizing the nature of the problem as discussed thus far, it has been discovered that if the regenerated color subcarrier S4 is obtained by means which require a division of the burst component of S1 by the video rate conversion factor N, then the phase of the regenerated color subcarrier must, as a practical matter, be readjusted to agree with that of the reproduced chrominance signal each time a different tape recorder or color encoder is selected by patch panel 15. The theoretical basis for this problem is relatively complex but may be easily understood by reference to the waveforms of FIG. 2 and the following analysis.

Assume that recorder 11 and encoder 13 are coupled together via patch panel 15 to apply the signal S1 to frame store 30. Assume that the recorder reproduces a solid chrominance field having the same phase as the burst component and that there is no phase difference between the color subcarrier reference produced by source 50 and the chrominance signal produced at the output connector of recorder 11. Make the same assumption regarding recorder 12 and encoder 14. Since all electrical cables exhibit an inherent delay, the chrominance signal conducted by cables from recoder 11 to the input of encoder 13 via patch panel 15 will necessarily undergo a phase shift relative to the reference signal produced by generator 50. The same is true regarding recorder 12 and encoder 14. Phase shift is also introduced by the cables connecting the encoder outputs to patch panel 15. If there is any difference in the recorder and encoder cable lengths a phase difference will be introduced between the recorder output signal s at the inputs of the encoders. Let the recorder chrominance signal frequency and phase difference be designated by 3.58 MHz+$\theta$.

The color encoder output cables may also differ in length. This can result in another chrominance phase difference term characteristic of encoders 13 and 14 which may be designated by $\theta$. Since the encoders provide subcarrier frequency translation by a heterodyning process (as described in the aforementioned Pritchard patent) the magnitude of the encoder input signal phase relationship is not disturbed although a sign reversal takes place in the process of down conversion of the 3.58 Mhz signal to the buried subcarrier frequency of 1.53 MHz. Accordingly the signal S1, under the given assumptions, exhibits two phase terms $-\theta$ and $+\theta$ which are characteristic of the phase differences introduced by the recorder and encoder connecting cables, respectively. The terms $\theta$ and $\phi$ are variables depending, among other things, on which of the recorders is connected to which of the encoders and which encoder is connected to terminal 32 of the frame store 30. Accordingly, as shown in FIG. 1, let the frequency and variable phase terms of input signal S1 to frame store 30 be designated by:

$$S1 = f_{bsc} - \theta\phi \qquad (1)$$

where $f_{bsc}$ is the assumed buried subcarrier frequency 1.53 MHz.

Since frame store 30 is a sampling system the chrominance signal, Sc, produced at the output of D/A converter 37 will be of the form:

$$Sc = (f_{bsc}/N) - \theta + \phi \qquad (2)$$

Figure 2:
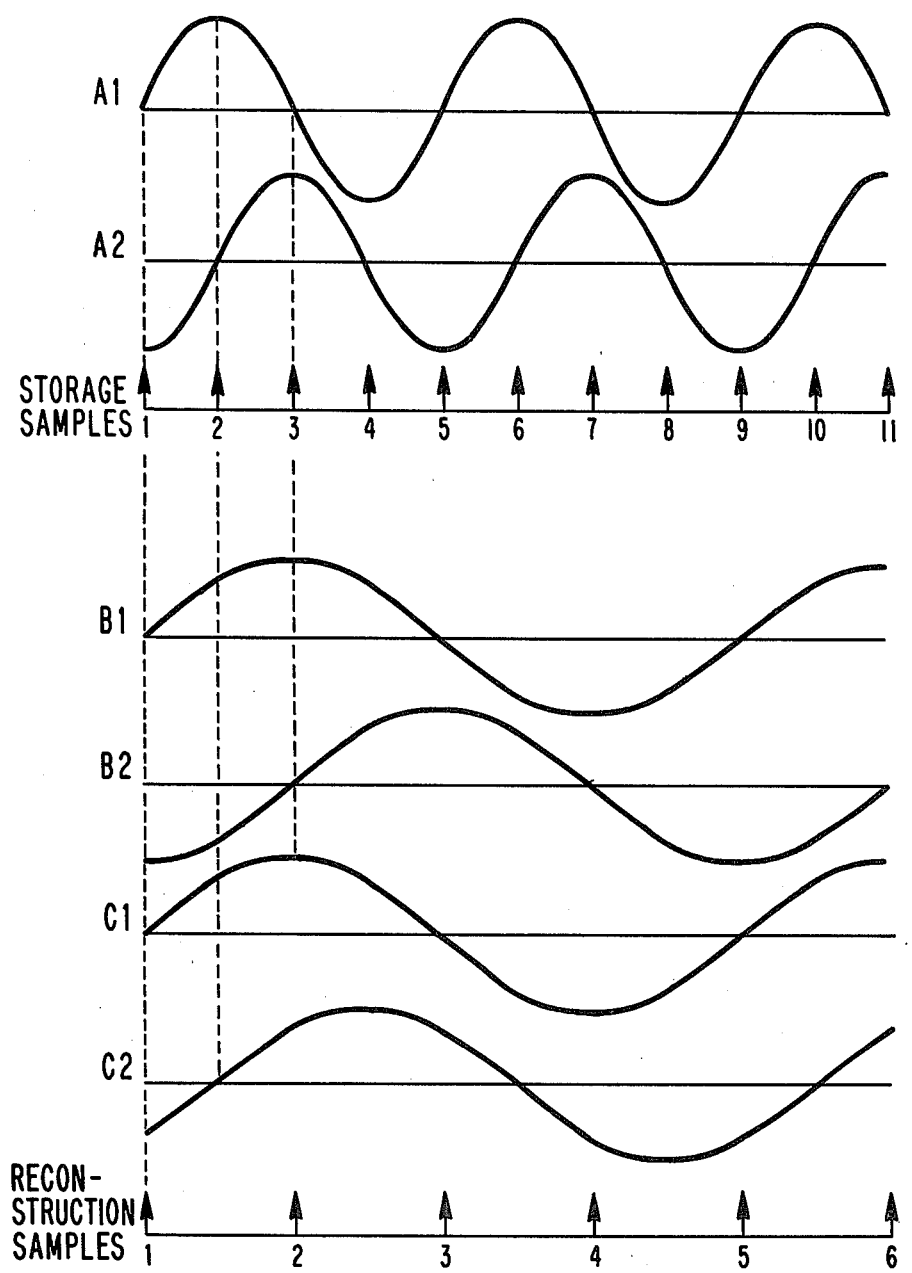
FIG. 2 is a waveform diagram illustrating certain aspects of the novel problem to which the invention is directed.

From a comparison of equations (1) and (2) it is clear that although the frequency of S1 has been reduced by N in the frame store the phase relationships are unaltered. This is due to the fact that in a sampling system the frequency reduction is proportional to the increase in time between samples. This is illustrated in FIG. 2 where waveforms A1 and A2 represent real time signals from different signal sources having different cable delays that are sampled by the frame store at the points indicated by the arrows labeled 1 to 11. Waveforms B1 and B2 represent the reconstruction of signals A1 and A2 respectively when the samples (labeled 1–6) occur at one-half real time rate (N=2). It can be seen that the phase relationship (90°) between these signals has been maintained.

Returning to FIG. 1, regenerator 20 includes an oscillator 22 locked to the burst component of S1 and therefore produces an output signal $f_{bsc} - \theta + \phi$. Note that if the output of oscillator 22 were merely divided by a modulo N counter as in the previously mentioned hypothetical regenerator the result $S_{22}$ would be $$S_{22} = \frac{1.53 \text{MHz}}{N} - \frac{\theta}{N} + \frac{\phi}{N} \qquad (3)$$

Equation 3 indicates that although the frequency of the regenerated subcarrier would be correct the phase terms would be reduced by N. This is illustrated in FIG. 2 where the waveforms A1 and A2 again represent real time signals from different signal sources having different cable delays and C1 and C2 represent signals A1 and A2 divided by 2 respectively. It can be seen that the time between similar points on the slowed down signals C1 and C2 is the same as between similar points on the real time signals as opposed to the sampled slowed down signals B1 and B2 where the difference between similar points is proportional to the increase in time between samples.

Accordingly, in the example of FIG. 1 if the output of oscillator 22 were merely divided by N to regenerate the color subcarrier reference signal S4, it would be possible to adjust the phase of the assumed divider at the output of oscillator 22 to be the same as the phase of the chrominance signal $S_c$, at the output of D/A converter 37 as illustrated by waveforms A1, C1 and B1 in FIG. 2. The terms $\theta$ and $\phi$, however, are variables which change with switching or interchange of recorders 11 and 12 and/or encoders 13 and 14 change $\theta$ and $\phi$. Accordingly, the phase of the subcarriers at the output of the assumed divider will be different from the phase of the chrominance signal produced at the output of converter 37 as illustrated by waveforms A2, C2 and B2 in FIG. 2. Therefore, it would be necessary to readjust the phase of the regenerated subcarrier S4 when switching between either tape recorders 11 and 12 or encoders 13 and 14.

The above described problem is solved by color subcarrier encoder 20 which provides an output signal of the form:

$$S4 = \frac{fbsc}{N} - \theta + \phi - \frac{\Delta(N-1)}{N} \qquad (4)$$

The term $\Delta$ is a constant characteristic phase delay of regenerator 20 and the factor $(N-1)/N$ is also a constant for any given N. By constraining the last term of equation 4 to equal zero, the phase of the signal S4 will always exhibit the same relationship to the chrominance signal produced by converter 37 as exists between the chrominance and burst components of S1 as is apparent from a comparison of equations (B 4) and (2).

The problem now comprises that of (1) finding a subcarrier regenerator capable of producing the signal S4 having the character defined by equation 4 and (2) eliminating the last term of equation 4. Regenerator 20 provides both these functions.

Specifically, regenerator 20 comprises a burst locked oscillator 22 for producing a first conversion signal having a frequency equal to the color burst component of S1. A reference signal generator 23 responsive to the color reference signal produced by generator 50 produces a second conversion signal having a frequency less than that of the first conversion signal by a factor $(N-1)/N$. A multiplier 24 multiplies the two conversion signals to form a product signal having sum and difference components. A filter 26 selects the lower sideband of the product signal, i.e., the difference component, and applies it as the color subcarrier reference signal S4 to burst-gate/combiner 46 for forming a composite video output signal having a regenerated burst component.

A phase shifter 25 (which may be interposed in any of the signal paths in regenerator 20) effects adjustment of the phase of the difference component of the product signal to a value such that the last term of equation 4 reduces to zero. Accordingly, the regenerated color subcarrier S4, and thus the regenerated burst component of the output signal at terminal 60 exhibits a phase relative to the chrominance component of the composite video output signal that is substantially equal to the chrominance-burst phase relationship of the frame store input signal S1.

The purpose of the color frame identification signal S2 applied to terminal 21 of regenerator 20 is to reset counters in generator 23 at the start of each color frame sequence to insure that generator 23 always exhibits a consistant phase relationship relative to the color reference signal produced by generator 50 and the particular color frames being produced by the selected recorder 11 or 12.

Figure 3:
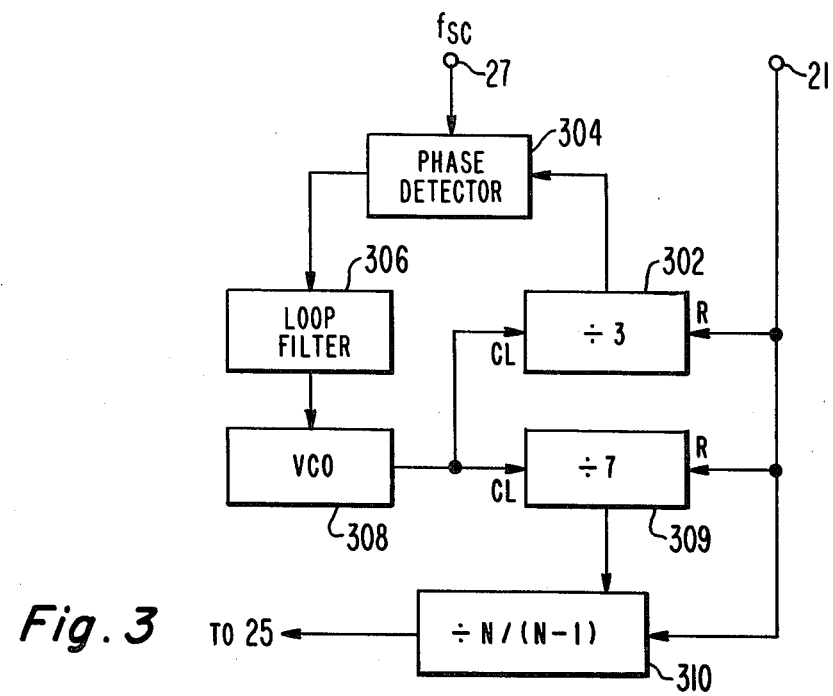
FIGS. 3 and 4 are block diagrams of reference signal generators suitable for use in the processor of FIG. 1.

FIG. 3 illustrates how generator 23 may be implemented using a phase locked loop for converting the 3.58 MHz signal of generator 50 to the buried subcarrier frequency of 1.53 MHz and how the 1.53 MHz signal may be reduced in frequency by the factor $N/(N-1)$.

In FIG. 3 a modulo 3 counter is used to divide the output of a voltage controlled oscillator by 3. The counter output is compared with the 3.58 MHz reference signal produced by generator 50 by means of phase detector 304 to provide an error signal which, after filtering in loop filter 306, controls the frequency of a voltage controlled oscillator 308 which supplies clock signals to the clock input (CL) of counter 302. The combination thus forms a multiplying phase locked loop in which the output of VCO 308 is locked to three times the 3.58 MHz reference frequency. A modulo 7 counter divides the triple reference frequency signal of VCO 308 by 7 thereby producing a signal having a frequency of 3.58 MHz$\times 3 \div 7$ which equals the buried subcarrier frequency of 1.53 MHz. This, in turn, is divided by $N/(N-1)$ in divider 310 to provide the signal $[(N-1)]$ fbsc of FIG. 1. Note that dividers 309 and 310 could be combined. All counters are reset by the color frame reset signal applied to terminal 21 for the reasons previously mentioned.

Figure 4:
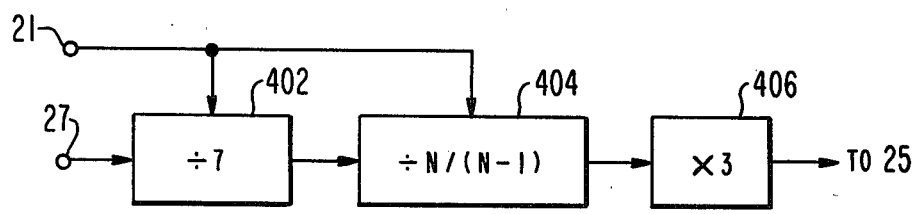

Generator 23 may be implemented as illustrated in FIG. 4 which performs the same function as in the example of FIG. 3 without requiring a phase locked loop. Terminal 27 is divided by 7 in modulo 7 counter 402, divided by $N/(N-1)$ in a cascaded divider 404 and multiplied by 3 in a tuned circuit tuned to the third harmonic of the output of divider 404 whereby the tuned circuit produces the output signal $(3/7) \times 3.58$ MHz (i.e., fbsc) reduced in frequency by the factor $(N-1)/N$. Counters of various moduli suitable for use in the generators of FIGS. 3 and 4 are well known. See, for example, the text "Handbook of Logic Circuits" by J. D. Lenk published by Reston Publishing Co., Inc., 1972.

Figure 5:
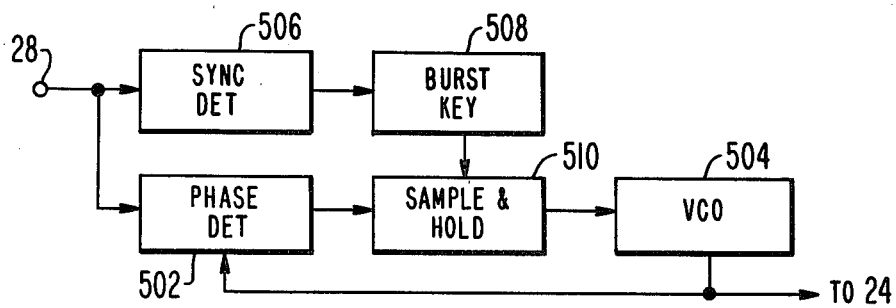
FIG. 5 is a block diagram of a burst locked oscillator suitable for use in the processor of FIG. 1.

In FIG. 5 burst locked oscillator 22 comprises an input terminal 28 to which the signal S1 is applied. A phase detector compared the output of a voltage controlled oscillator 504 with S1 to produce an error signal at the phase detector output. A sync detector 506 detects the horizontal synchronizing component of S1 at terminal 28 and triggers a burst key generator 508 which, in turn, enables a sample and hold circuit 510 which samples the phase detector error voltage during the burst interval. The output of circuit 510 locks VCO 504 to the burst frequency of S1.

What is claimed is:

1. A color subcarrier regenerator for use in a video signal frame store of the type in which luminance and chrominance components of a composite video input signal are stored at one rate and recovered from the frame store at a lesser rate 1/N, N being an integer greater than unity, said regenerator comprising:

first means responsive to the color burst component of said input video signal for producing a first conversion signal having a frequency equal to that of said color burst component;

second means responsive to a fixed reference frequency signal for producing a second conversion signal having a frequency less than that of said first conversion signal by a factor $(N-1)/N$;

third means for multiplying said conversion signals to form a product signal having sum and difference components;

fourth means for applying said difference component of said product signal as a color subcarrier reference signal to a combining means in said frame store for forming a composite video output signal having a regenerated burst component; and fifth means for effectively adjusting the phase of said difference component of said product signal to a value such that said regenerated burst component exhibits a phase relative to the chrominance component of said video output signal substantially equal to the phase relationship between the chrominance and burst components of said composite video input signal.

2. A color subcarrier regenerator as recited in claim 1 wherein said second means includes divider means and further comprises means for presetting said divider means to a predetermined state on a periodic basis related to a parameter of said composite video intput signal.

3. A color subcarrier regenerator as recited in claim 2 further comprising means for producing said composite video signal, said means including a plurality of slow motion tape recorders and means for connecting a selected one of said recorders to an input of said frame store.

4. A color subcarrier regenerator as recited in claim 3 further comprising color encoder means and means for interposing said color encoder means in the connection of said selected tape recorder and said input of said frame store.

5. A color subcarrier regenerator as recited in claim 1 wherein said fifth means comprises a phase shift network interposed in any input-output path of said first, second, third or fourth means.

6. A color subcarrier regenerator for use in a video signal frame store of the type in which luminance and chrominance components of a composite video input signal are stored at one rate and recovered from the frame store at a lesser rate 1/N, N being an integer greater than unity, said regenerator comprising:

burst locked oscillator means responsive to a color burst component of said composite video input signal for producing a first conversion signal;

a reference signal source for producing a second conversion signal having a frequency equal to that of said first conversion signal, said conversion signals having a phase relationship therebetween which may vary for different sources of said input video signal;

circuit means for reducing the frequency of said second conversion signal by a factor $(N-1)/N$;

multiplier means responsive to the conversion signal of reduced frequency and to said first conversion signal for forming a product signal having a sum component and a different component;

means for applying said difference component of said product signal as a color reference signal to a combining means in said frame store for forming a composite video output signal having a regenerated burst component; and means in said regenerator for setting the phase of said difference component of said product signal to a value such that said regenerated burst component exhibits a phase relationship relative to the chrominance component of said composite video output signal substantially equal to the phase relationship between the chrominance and burst components of said composite video input signal;

whereby the input-output chrominance-burst phase relationship of said frame store is rendered substantially independent of the source of said video input signal.

* * * * *